(12) United States Patent
Parker et al.

(10) Patent No.: US 7,787,551 B2
(45) Date of Patent: *Aug. 31, 2010

(54) PHASOR FRAGMENTATION CIRCUITRY AND METHOD FOR PROCESSING MODULATED SIGNALS HAVING NON-CONSTANT ENVELOPES

(76) Inventors: Kevin R. Parker, 13 Pickwick Dr., Ottawa, Ontario (CA) K2J 3H8; Stephen R. Hobbs, 47 Fifth Ave., Ottawa, Ontario (CA) K1S 2M3; Jean-Paul R. DeCruyenaere, 2404 Malone Crescent, Ottawa, Ontario (CA) K2C 1L5

(*) Notice: Subject to any disclaimer, the term of this patent is extended or adjusted under 35 U.S.C. 154(b) by 766 days.

This patent is subject to a terminal disclaimer.

(21) Appl. No.: 11/488,383

(22) Filed: Jul. 17, 2006

(65) Prior Publication Data

US 2007/0183534 A1 Aug. 9, 2007

Related U.S. Application Data

(63) Continuation-in-part of application No. 10/273,908, filed on Oct. 18, 2002, now Pat. No. 7,085,327.

(51) Int. Cl.
*H04L 27/28* (2006.01)
*H04L 5/12* (2006.01)
*H04L 23/02* (2006.01)

(52) U.S. Cl. .............. 375/261; 375/260; 375/271; 375/371; 370/215; 370/233

(58) Field of Classification Search .............. 375/226, 375/240.27, 261, 268–275, 278, 293, 300–308, 375/320–323, 329–336; 370/203, 342, 343, 370/204, 205, 206, 210, 215, 478
See application file for complete search history.

(56) References Cited

U.S. PATENT DOCUMENTS 5,862,457 A   1/1999   Winters (Continued)

FOREIGN PATENT DOCUMENTS

EP   0735731 A2   10/1996

(Continued)

OTHER PUBLICATIONS

Zhang et al, "Gain and Phase Error-Free LINC Transmitter," IEEE Transactions on Vehicular Technology, vol. 49, No. 5, Sep. 2000, pp. 1986-1994.

(Continued)

*Primary Examiner*—David C Payne
*Assistant Examiner*—Linda Wong
(74) *Attorney, Agent, or Firm*—Stolowitz Ford Cowger LLP

(57) ABSTRACT

An improvement for a phasor fragmentation engine and method, whereby a phasor flipping algorithm is applied when determining fragment phasors for a non-constant envelope modulation signal (e.g. OFDM). The phasor flipping algorithm avoids sharp phase transitions for the fragment phasors, which cause an increase in bandwidth, by performing a comparison of the phasor angle separation between the prior and current time samples. This comparison corresponds to a determination of whether the modulation signal V has passed near or through zero. When it is determined that the calculated phases of $V_\alpha$ and $V_\beta$ would result in a larger angle of separation between the calculated phase of $V_\alpha$ (for phasor A) for the current time sample (N) and the phase of $V_A$ for the previous time sample (N−1) than the angle of separation between the calculated phase of $V_\alpha$ (for phasor B) for the current time sample (N) and the phase of $V_A$ for the previous time sample (N−1), the phase values for the phasor fragments $V_\alpha$ and $V_\beta$ are swapped so that the phase of $V_A$ is that of $V_\beta$ (i.e. $V_A=V_\beta$) and the phase of $V_B$ is that of $V_\alpha$ (i.e. $V_B=V_\alpha$).

16 Claims, 5 Drawing Sheets

U.S. PATENT DOCUMENTS

| | | | |
|---|---|---|---|
| 5,990,738 A | | 11/1999 | Wright |
| 6,130,918 A | * | 10/2000 | Humphrey et al. .......... 375/295 |
| 6,459,716 B1 | * | 10/2002 | Lo et al. ..................... 372/50.1 |
| 6,996,189 B1 | | 2/2003 | Morejon et al. |
| 6,556,557 B1 | * | 4/2003 | Cimini et al. ............... 370/342 |
| 6,618,352 B1 | * | 9/2003 | Shirakata et al. ............ 370/203 |
| RE38,483 E | * | 3/2004 | Oshima ........................ 386/46 |
| 6,731,695 B2 | * | 5/2004 | Tzannes et al. ............. 375/298 |
| 7,136,423 B1 | * | 11/2006 | Duvaut et al. ............... 375/260 |
| 7,295,626 B2 | * | 11/2007 | Chayat ........................ 375/295 |
| 2003/0142621 A1 | * | 7/2003 | Uesugi ........................ 370/203 |
| 2005/0141408 A1 | | 6/2005 | Anvari |

FOREIGN PATENT DOCUMENTS

| | | |
|---|---|---|
| EP | 0735731 A3 | 10/1996 |
| EP | 1195917 B1 | 2/2004 |
| JP | A-H08-1996-288970 | 11/1996 |
| JP | A-2000-269920 | 9/2000 |
| JP | A-2000-358009 | 12/2000 |
| WO | 9705721 | 2/1997 |

OTHER PUBLICATIONS

Jaehyok Yi et al., Effect on Efficiency Optimization on Linearity of LINC Amplifiers with CDMA Signal, IEEE MTT-S Digest, 2001, pp. 1359-1362, South Korea.

S.A. Hetzel et al., LINC Transmitter, Electronic Letters, vol. 27, No. 10, May 9, 1991, pp. 844-846.

Bob Stengel et al., LINC Power Amplifier Combiner Method Efficiency Optimization, IEEE Transactions on Vehicular Technlogy, vol. 49, No. 1, Jan. 2000, pp. 229-234.

C.P. Conradi et al., Evaluation of a Lossless Combiner in a LINC Transmitter, IEEE Canadian Conference on Electrical and Computer Engineering, Shaw Conference Center, Edmonton, Alberta, May 9-12, 1999, pp. 105-110.

Maurice Tarsia et al., A Low Stress 20dBm Power Amplifier for LINC Transmission with 50% Peak PAE in 0.25 .mu.m CMOS, 26sup.th European Solid State CCTS. Conference, Sweden, Sep. 19-27, 2000, pp. 1-4.

Robert Langridge, A Power Re-Use Technique for Improved Efficiency of Outphasing Microwave Power Amplifiers, IEEE Transactions on Microwave Theory and Techniques, vol. 47, No. 4, Aug. 1999, pp. 1467-1470.

Steve C. Cripps, RF Power Amplifiers for Wireless Communications, Efficiency Enhancement Techniques, 1999, pp. 240-247.

Frederick H. Raab, Efficiency of Outphasing RF Power-Amplifier Systems, IEEE Transactions on Communications, vol. Com-33, No. 10, Oct. 1985, pp. 1094-1098.

PCT International Search Report for International Application No. PCT/CA03/01545, International Filing date: Oct. 14, 2003, Earliest Priority Date: Oct. 18, 2002.

Crimini, L.J., et al., "Peak-to-Average Power Ratio Reduction of an OFDM Signal Using Partial Transmit Sequences," IEEE International Conference on Communications, vol. 1, Jun. 6-10, 1999, p. 511, IEEE, New York, U.S.A.

Daneshrad, Babak et at., "Performanace and implimentation of cluster -OFDM for wireless communications" Mobile Networks and Applications, Dec. 1997, pp. 305-314, URL, http://www.springerlink.com/content/h3p78p15k5720885/fulltext.pdf.

Rui Dinis et al., "Performance trade-offs with quasi-linearly amplified OFDM through atwo-branch combining technique," Vehicular Technology Conference, 1996, "Mobile technology for the Human Race," IEEE 46th, Apr. 28, 1996, pp. 899-903.

* cited by examiner

US 7,787,551 B2

PHASOR FRAGMENTATION CIRCUITRY AND METHOD FOR PROCESSING MODULATED SIGNALS HAVING NON-CONSTANT ENVELOPES

CROSS-REFERENCE TO RELATED APPLICATIONS

The present application is a continuation-in-part of U.S. application Ser. No. 10/273,908 filed Oct. 18, 2002 now U.S. Pat. No. 7,085,327. Said application Ser. No. 10/273,908 is hereby incorporated herein in its entirety.

FIELD OF THE INVENTION

The invention relates to a computational circuit and method for improved processing of modulated signals having non-constant envelopes e.g. multi-carrier OFDM (orthogonal frequency division multiplex) or single carrier QAM (quadrature amplitude modulation). More particularly, an improved phasor fragmentation algorithm is provided for deconstructing such a modulated signal into representative fragment signals having reduced peak-to-average power ratios while avoiding sharp phase transitions which increase bandwidth.

BACKGROUND

Computational modulation is usefully employed in both wireless and wireline applications to implement non-constant envelope modulation schemes such as OFDM or QAM, whereby the term "computational modulation" refers to digitally generated modulation performed by computational means (e.g. by a DSP). For example, a wireline application may be an xDSL transport system and a wireless (RF) application may be the 802.11a wireless LAN standard, or its variants, or Broadband Fixed Wireless Systems such as LMDS or MMDS. In such applications the data is typically scrambled, encoded, and interleaved before being modulated. In the case of wireless applications, the computational modulation is performed before the signal is fed to a digital-to-analog converter (DAC) and subsequently up-converted and amplified for wireless transmission.

OFDM and other related multi-carrier modulation schemes are based on repetitively assigning a multiple of symbols to a multiple of carrier frequencies and calculating the IFFT to obtain the sequential segments of the time waveform to be transmitted. In order to establish phase references for the demodulation decision, training tones are periodically spaced throughout the multiple of carrier frequencies. A significant problem for OFDM modulation is the very high peak-to-average power ratio that may occur during the time sequence output for each IFFT operation. A peak will occur when a majority of the individual carrier frequencies line up in-phase (if a peak appears, it is unlikely that a second one will occur within the same IFFT time segment due to the relatively small number of time samples).

The up-converter and power amplifier of an RF transmitter must perform the frequency shifting and amplification, respectively, of the modulated carrier with a minimum of distortion. In order to achieve a minimum of distortion in a multi-carrier OFDM or single carrier QAM modulation scheme, the up-converter must have a very high dynamic range (i.e. they must be linear and, hence, must have a high compression point). Also, a large power back-off (e.g. 12 dB) for the power amplifier is required due to the high peak-to-average power ratios encountered. Both the high dynamic range requirement and the large power back-off requirement result in a very high DC power consumption for the transmitter and this creates a disadvantage of both OFDM and QAM for wireless or wireline applications.

The designs now being used for the 802.11a 5 GHz wireless standard integrate the transmitter functions of scrambling, encoding, IFFT (Inverse Fast Fourier Transform) generation, modulating, up-converting, and power amplifying without directly addressing the problem of the high peak-to-average power ratio associated with OFDM modulation. However, co-pending U.S. continuation-in-part application Ser. No. 10/205,743 of the assignee of this application, filed on 26 Jul. 2002, provides a signal fragmentation engine which both complements the computational modulation circuitry used in 802.11a architectures and addresses the need for circuitry enabling the use of power efficient, dynamic-range limited RF circuits such as Class D power amplifiers (also referred to as Class S) or Class F Switch Mode power amplifiers and low compression-point up-converters. The contents of co-pending U.S. continuation-in-part application Ser. No. 10/205,743 is incorporated herein by reference.

The reduced peak-to-average power ratios of the fragment signals produced by the assignee's foregoing fragmentation engine are, however, produced at the expense of an associated increase in phase modulation rate (i.e. bandwidth). Therefore, there is a need for an improved fragmentation engine which addresses the increased bandwidth requirements of the foregoing fragmentation engine.

SUMMARY OF THE INVENTION

In accordance with one aspect of the invention there is provided a phasor flipping component for use in a phasor fragmentation component of transmitter circuitry configured for digitally determining a plurality of equal amplitude fragment phasors (e.g. in the described embodiment this amplitude is constant and equal to $V_{MAX}/2$) representative of a non-constant envelope modulation signal, the amplitude of the fragment phasors being a predetermined proportion of the variation of the amplitude of the modulation signal about the mean amplitude thereof. The phasor flipping component is configured to perform a comparison of angle separations between preselected fragment phasors, as determined for each of prior and current time samples. The phases determined for the fragment phasors for a current time sample are swapped when the comparison identifies that the angle separation for a first the fragment phasor between the prior and current time samples changes from being less than to greater than the angle separation between a second fragment phasor for the current time sample and the first fragment phasor for the prior time sample.

Also in accordance with the invention a phasor flipping component and method are provided for swapping the phases determined for the fragment phasors for a current time sample when the amplitude of the modulation signal transitions near or through zero. A determination is made as whether the phases of fragment phasors $V_\alpha$ and $V_\beta$, as determined for fragment phasors $V_A$ and $V_B$, respectively, for a current time sample (N), would result in a larger angle separation between the phase of $V_\alpha$ for the current time sample and the phase of $V_A$ for the previous time sample (N−1) than the angle separation between the phase of $V_B$ for the current time sample (N) and the phase of $V_A$ for the previous time sample (N−1). If it would, the phases for $V_\alpha$ and $V_\beta$ are swapped.

The angle separation comparison may be governed by the following phase limitations:

$\alpha_N$=(A, if $d_1 \leq d_2$
(B, if $d_1 > d_2$ and, $\beta_N = $ (B, if $d_1 \leq d_2$
(A, if $d_1 > d_2$ where, A=θ+φ and B=θ−φ, and, $d_1$=AngleSeparation(A−$\alpha_{N-1}$)
$d_2$=AngleSeparation(B−$\alpha_{N-1}$)

In accordance with a further aspect of the invention there is also provided a method for determining fragment phasors for a plurality of equal amplitude fragment signals representative of a non-constant envelope modulation signal, the amplitude of the fragment signals being a predetermined proportion of the variation of the amplitude of the modulation about a mean amplitude thereof. A comparison is made of the angle separations between preselected fragment phasors, as determined for each of prior and current time samples, and the phases determined for the fragment phasors for a current time sample are swapped when the comparison identifies that the angle separation for a first the fragment phasor between the prior and current time samples changes from being less than to greater than the angle separation between a second fragment phasor for the current time sample and the first fragment phasor for the prior time sample.

BRIEF DESCRIPTION OF THE DRAWINGS

An embodiment of the invention will now be described in detail with reference to the following drawings in which like reference numerals pertain to like elements throughout.

DESCRIPTION OF ILLUSTRATED EMBODIMENT

As described in the aforesaid co-pending U.S. continuation-in-part application Ser. No. 10/205,743, a phasor fragmentation engine for a wireless or wireline transmitter was previously developed by the assignee whereby a complementary computational phasor fragmentation algorithm is applied to a modulated signal such as OFDM or QAM. In essence, the phasor fragmentation engine deconstructs a predetermined modulation waveform into signal components, referred to herein as fragment phasors (signals), which are of equal magnitude. Accordingly, these fragment signals individually have lower peak-to-average power ratios than the modulation signal. Advantageously, multiple identical analog circuits, having low dynamic ranges and small power back-offs, may then be used to further process the fragment signals (specifically, Class D or F power amplifiers and, for wireless applications, low compression-point up-converters).

Following analog circuit processing the fragment signals are recombined to reproduce the original modulation waveform for transmission, such as by an 802.11a transmitter for which the modulation signal is a multi-carrier OFDM signal. However, it is to be understood that the phasor fragmentation engine may be appropriately applied to other non-constant envelope modulation schemes, including single carrier QAM computational modulators, as well as to wireline applications.

Figure 1:
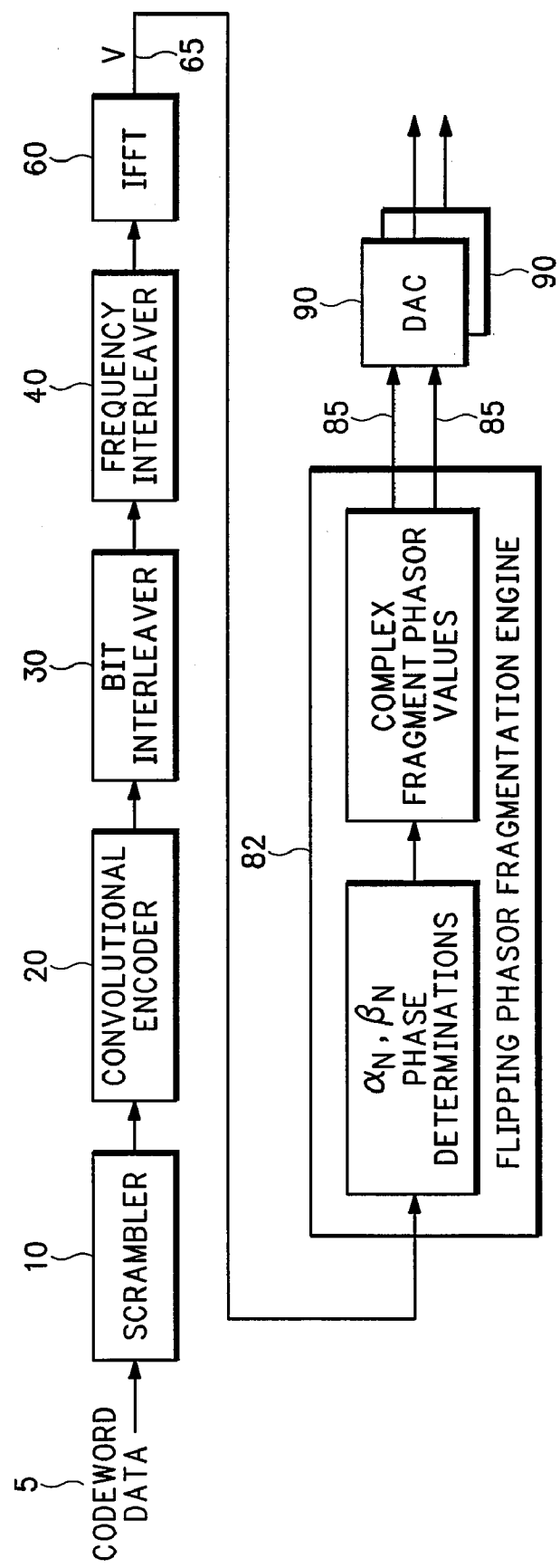
FIG. 1 is a block diagram showing components of a radio transmitter comprising a flipping phasor fragmentation engine in accordance with the invention.

FIG. 1 illustrates a fragmentation engine with a phasor flipping component in accordance with the invention. The basic components of the phasor fragmentation engine are disclosed in the assignee's co-pending U.S. application Ser. No. 10/205,743. The present invention adds an improvement to those components in the form of a phasor flipping component which performs a phasor flipping algorithm in the determination of the fragment phasors. The flipping phasor fragmentation engine 82 is shown, in block diagram form, within a wireless LAN 802.11a transmitter. An input signal 5 is processed by a scrambler 10, an encoder 20 and bit and frequency interleaver processing blocks 30, 40. Following modulation of the signal, by transformation by an IFFT 60, the modulation signal 65 is deconstructed by the phasor fragmentation engine 82 and the resulting fragment signals 85 output therefrom, each having a better peak-to-average power ratio than modulation signal 65, are input to digital-to-analog converters (DACs) 90. The fragment signals 85 output from the phasor fragmentation engine need not be orthogonal. However, the fragmentation operations must be linear in nature, to enable reconstruction of the output fragment signals 85, following power amplification, to a signal which corresponds to the modulation signal from which they were derived. Additional pre-conditioning and complementary deconstruction engines have also been developed by the assignee, and are disclosed in U.S. application Ser. No. 10/205,743, but are not pertinent to the present disclosure of the subject invention which relates to an improvement of the phaser fragmentation engine.

For computationally generated OFDM or QAM signals, the modulated signal 65 is a sequence of complex (magnitude and phase) time samples. The phasor fragmentation engine 82 includes phase determination and phasor fragment processing components which convert this sequence to parallel sequences for the two fragment phasors (carriers) by making use of the property of the isosceles triangle. The modulation signal 65, having amplitude and phase variation, is converted to two signals (viz. fragment phasors 85) each having a predetermined reduction in amplitude variation. A preferred linear equation providing the predetermined proportion for the fragment phasor amplitudes is the following:

$$V_{PHASOR} = aV_{MAX}(V - V_{MIN})/(V_{MAX} - V_{MIN}) +$$
$$bV_{MIN}(V_{MAX} - V)/(V_{MAX} - V_{MIN})$$
$$= K1V - K2$$

wherein, $V_{PHASOR}$ is the amplitude (i.e. magnitude) of each of the two fragment phasors $V_{MAX}$ is the maximum amplitude of the modulated signal V is the current amplitude of the modulated signal $V_{MIN}$ is the minimum amplitude of the modulated signal a and b; and K1 and K2, are constants By assigning a=0.5 and b=1.0 in the above equation a 6 dB reduction in the peak-to-average power ratio is achieved. In the limit, the amplitude variation is reduced to zero and it is to be noted that the resulting reduced peak-to-average power ratio on each fragment phasor 85 results in an increase in the rate of phase modulation experienced (because it is inherent that the greater the reduction in peak-to-average power ratio the greater will be the increase in phase modulation rate i.e bandwidth).

Figure 2:
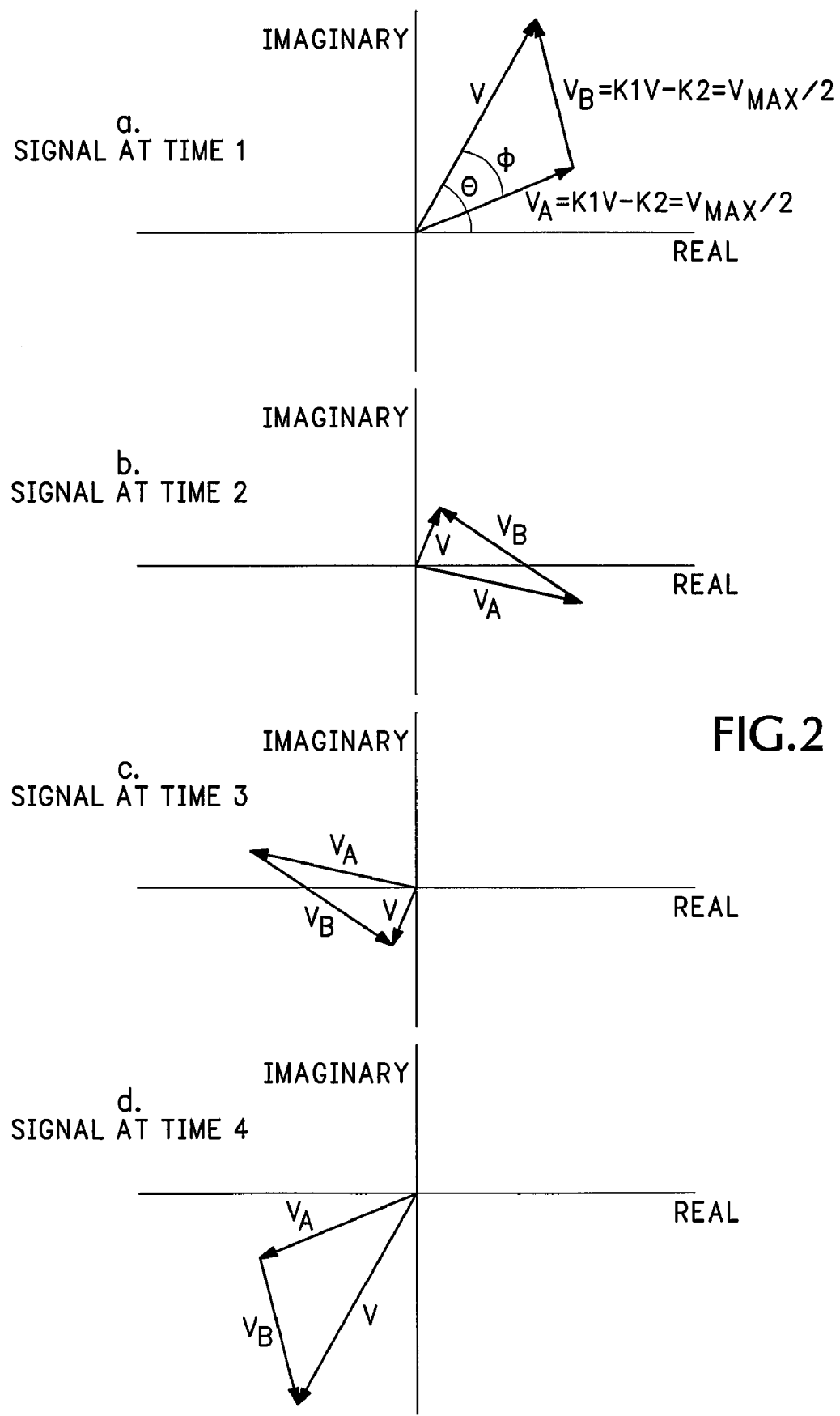
FIGS. 2a-2d illustrate four vector diagrams of a modulation signal, shown as phasor V, each at a different time, whereby the phasor V is represented as the sum of two equal magnitude fragment phasors $V_A$ (equal to $V_{max}/2$) and $V_B$ (also equal to $V_{max}/2$) which are continuously rotated to track the time varying magnitude and phase of the modulation phasor V, in accordance with the assignee's earlier developed phasor fragmentation engine disclosed in co-pending U.S. application Ser. No. 10/205,743. In this example, the magnitude (K1V−K2) of the fragment phasors $V_A$ and $V_B$ is selected to be constant and dependent on the maximum magnitude of V over the period of the sample viz. the constant value $V_{max}/2$.
Figure 3:
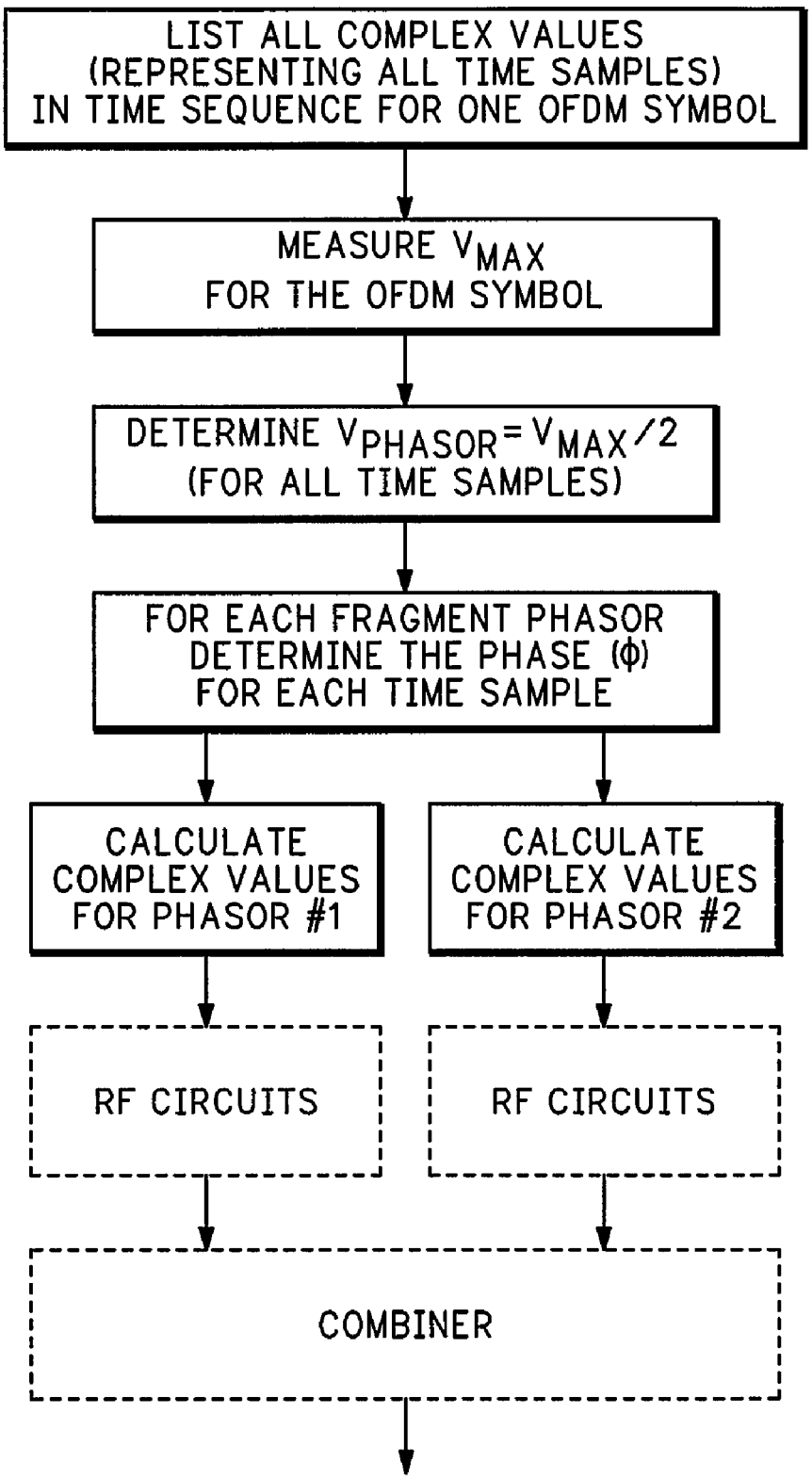
FIG. 3 is a flow chart illustrating the computational steps performed by a DSP (digital signal processor) to produce the two fragment phasors shown in FIG. 2 (and with the RF circuits of a wireless transmitter shown in dotted outline for purposes of illustration only, it being understood that the described phasor fragmentation engine may also be used for wireline applications)
Figure 4:
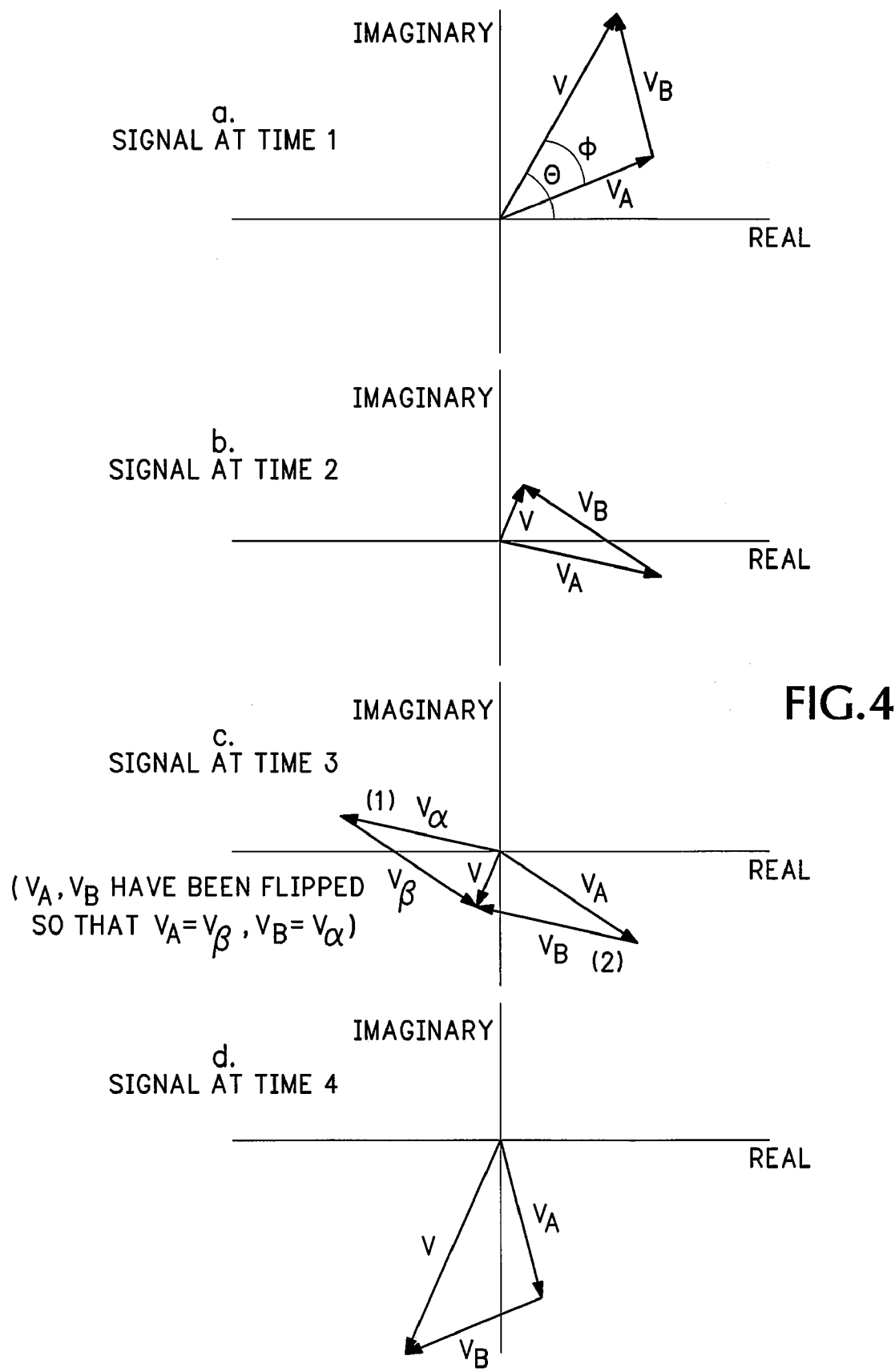
FIGS. 4a-4d illustrate four vector diagrams of the modulation signal, phasor V, at the same times shown by FIGS. 2a-2d, respectively, but showing the deconstruction of phasor V into fragment phasors $V_A$ and $V_B$ according to the flipping phasor fragmentation component of the invention claimed herein, whereby the two equal magnitude fragment phasors $V_A$ and $V_B$ are flipped (swapped) as the envelope (i.e. V) transitions through zero to avoid the sharp phase reversals of the fragment phasors associated with that transition point (these sharp phase changes being undesirable because they result in higher bandwidth); and, FIG. 5 is a flow chart illustrating the computational steps performed by a DSP (digital signal processor) to produce the two fragment phasors illustrated in FIG. 4 using a flipping phasor fragmentation component according to the present invention (and with the RF circuits of a wireless transmitter shown in dotted outline for purposes of illustration only, it being understood that the described phasor fragmentation engine may also be used for wireline applications).

For purposes only of illustrating an example of signal fragmentation performed according to the foregoing phasor fragmentation algorithm, but without the present phasor flipping improvement, FIGS. 2a-2d provide a set of four Vector diagrams, each representing the fragmentation of a modulation signal V at a different time, and FIG. 3 provides a flow chart of the fragmentation steps. In each Vector diagram of FIGS. 2a-2d the modulation signal V is represented as the sum of two equal amplitude fragment phasors A and B, where $V_A$ and $V_B$ are both equal to K1V−K2 and are continuously rotated to track the time varying magnitude and phase of the modulation phasor V. In this example, the magnitude of the fragment phasors $V_A$ and $V_B$ is selected to be constant and dependent on the maximum magnitude of V over the period of the sample viz. the constant value $V_{max}/2$. As best shown by the flow chart of FIG. 3, the angle $\phi$ is determined and is added to and subtracted from phase $\theta$ of the modulation signal V at each time sample, to create the two phases for the fragment phasors A and B, where $\phi=\cos^{-1}(0.5\ V/V_{PHASOR})=\cos^{-1}(V/V_{MAX})$ when $V_{PHASOR}$ is equal to $V_{max}/2$. Thus, the phase of phasor A is $\theta+\phi$) and the phase of phasor B is $\theta-\phi$. It can be seen from this that when the modulation signal transitions through zero (i.e. V=0) the phase offset $\phi$ of its fragments approaches 90°. This represents a sharp reversal in the phase trajectories when the modulation signal transitions near or through zero and, undesirably, results in a higher bandwidth.

The phasor flipping component of the phasor fragmentation engine 82 is a DSP algorithm in the embodiment described herein and the steps performed by the phasor flipping component are shown by FIGS. 4a-4d and 5.

The Vector diagrams of FIGS. 4a-4d illustrate the fragment phasors A and B which are determined by the phasor fragmentation engine 82 for the modulation signal, phasor V, at the same times shown by FIGS. 2a-2d, respectively. That is, the fragment phasors $V_A$ and $V_B$ shown in FIGS. 4a-4d are those which are determined for the same time sample as those shown in FIGS. 2a-2d, respectively, but those shown by FIGS. 4a-4d also include the results of the phasor flipping component of the present invention. The results performed by the phasor flipping component are readily seen from a comparison of FIGS. 2c and 4c, the former showing the result of the fragmentation without application of the flipping algorithm and the latter showing the advantageous result produced by applying the flipping algorithm. As can be seen from FIGS. 2b and 2c, which do not use the flipping algorithm of the present invention, the transition of the modulation signal envelope (V) through zero (e.g. passing from time b to c) causes the phases of fragment phasors $V_A$ and $V_B$ to substantially change during that time period and this sharp phase transition causes the bandwidth to increase.

Advantageously, the sharp phase transition shown by FIGS. 2b and 2c is avoided by applying the phasor flipping algorithm of the present invention. First, the phasor fragments $V_\alpha$ and $V_\beta$ (see (1) in FIG. 4c) are determined on the basis of the foregoing basic fragmentation steps and, as shown, these phasors correspond to those of FIG. 2c. Then an angular separation comparison is performed by the phasor flipping component, corresponding to a determination of whether the modulation signal V has passed near or through zero. When this comparison identifies that the calculated phases of $V_\alpha$ and $V_\beta$ would result in a larger angle of separation between the calculated phase $V_\alpha$ for phasor A for the current time sample (N) and the phase of $V_A$ for the previous time sample (N−1) than the angle of separation between the calculated phase $V_\beta$ for phasor B for the current time sample (N) and the phase of $V_A$ for the previous time sample (N−1), the phase values for the phasor fragments $V_\alpha$ and $V_\beta$ are swapped so that the phase of $V_A$ is that of $V_\beta$ (i.e. $V_A=V_\beta$) and the phase of $V_B$ is that of $V_\alpha$ (i.e. $V_B=V_\alpha$) (see (2) in FIG. 4c). This is shown mathematically by the following, for which $\alpha_N$ and $\beta_N$ are the phases assigned to phasors A and B, respectively:

$$\alpha_N = (A,\ \text{if}\ d_1 \leq d_2$$
$$(B,\ \text{if}\ d_1 > d_2$$
$$\beta_N = (B,\ \text{if}\ d_1 \leq d_2$$
$$(A,\ \text{if}\ d_1 > d_2$$

where, A=$\theta+\phi$ and B=$\theta-\phi$, and, $d_1$=AngleSeparation(A−$\alpha_{N-1}$)

$d_2$=AngleSeparation(B−$\alpha_{N-1}$)

Figure 5:
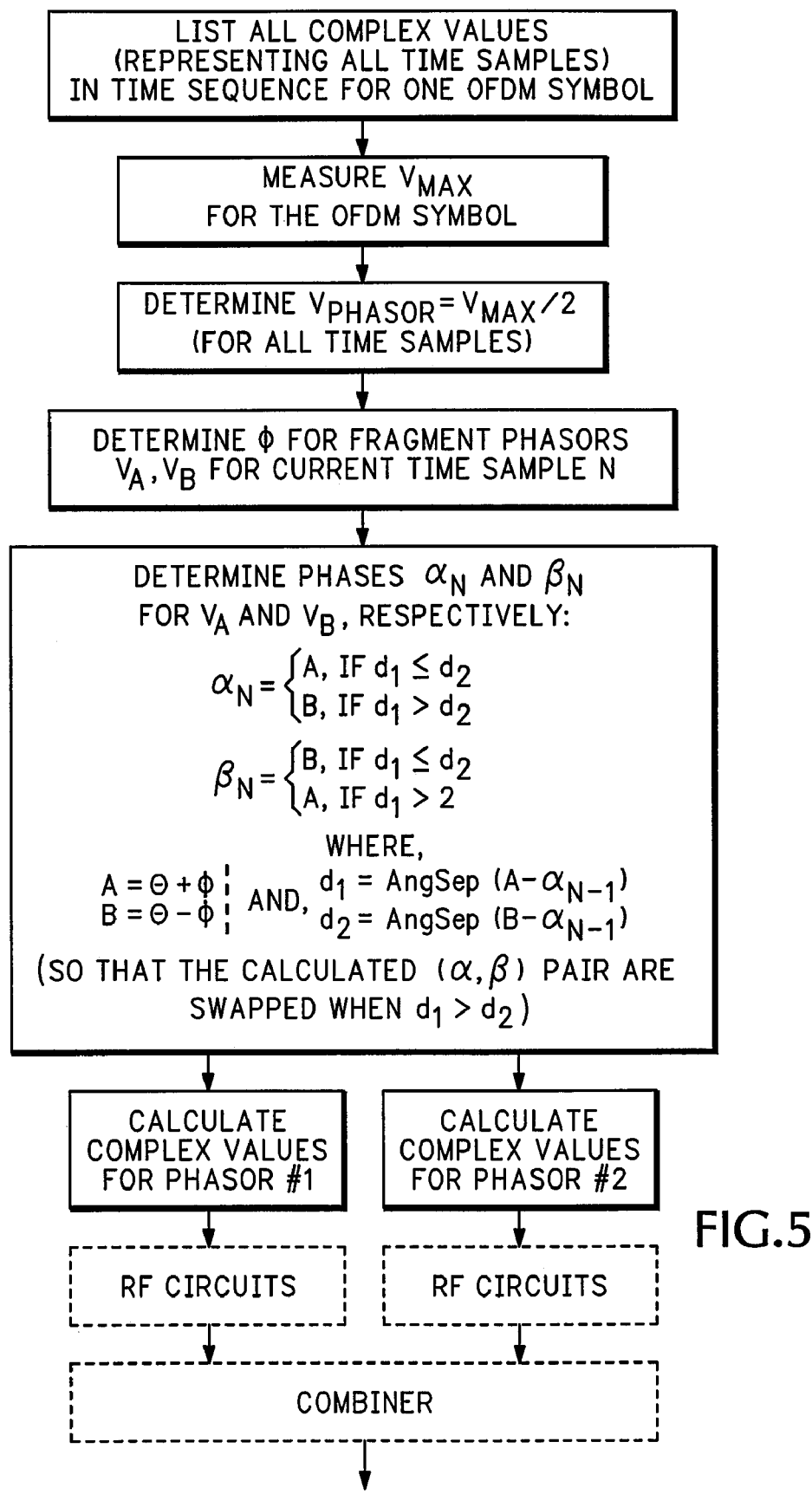

The flow chart of FIG. 5 illustrates the foregoing steps performed by the flipping phasor fragmentation component (being a DSP algorithm in this embodiment). The RF circuits of a wireless transmitter are shown in dotted outline for purposes of illustration only, it being understood that the described phasor fragmentation engine may also be used for wireline applications.

The phasor-fragmentation engine reduces the peak-to-average power ratio of waveforms such as OFDM without compromising the air interface standard for a wireless application, by applying modified signals to parallel up-converter/power amplifier chains. Upon power combining, the OFDM waveform is regenerated. In order to ensure the regenerated OFDM waveform is not distorted, it is preferred that appropriate calibration and/or linearization circuits (e.g. predistortion) be used to compensate for differences in channel gains and phases.

The term "component" herein, with reference to either the phasor fragmentation engine 82 as a whole, or the phasor flipping circuit component thereof, refers generally to computational (i.e. algorithmic) processing means and is not intended to imply or require any specific form. For the illustrated embodiment this component is in the form of a DSP algorithm but suitable alternate forms may be used instead.

The individual electronic and processing functions utilised in the foregoing described embodiments are, individually, well understood by those skilled in the art. It is to be understood by the reader that a variety of other implementations may be devised by skilled persons for substitution. Persons skilled in the field of telecommunications and computer equipment design will be readily able to apply the present invention to an appropriate implementation for a given application. Consequently, it is to be understood that the particular embodiments shown and described herein by way of illustration are not intended to limit the scope of the invention claimed by the inventor which is defined by the appended claims.

What is claimed is:

1. A circuit-implemented method for deconstructing a modulated signal, comprising:
    using the circuit, comparing an angle of separation between a phase of a first phasor at a first time and the phase of the first phasor at a second time to an angle of separation between a phase of a second phasor at the first time and the phase of the first phasor at the second time; and
    using the circuit, setting the phase of the first phasor at the second time to be equal to the phase of the second phasor at the first time, or setting the phase of the second phasor at the second time to be equal to the phase of the first phasor at the first time, responsive to the comparison to modify bandwidth requirements of the modulated signal.

2. The circuit-implemented method of claim 1, wherein one or more of the first phasor at the first time, the first phasor at the second time, the second phasor at the first time, or the second phasor at the second time, comprises a fragment phasor.

3. The circuit-implemented method of claim 1, wherein one or more of the first phasor at the first time, the first phasor at the second time, the second phasor at the first time, or the second phasor at the second time, comprises a time sample.

4. The circuit-implemented method of claim 1, wherein the first phasor at the first time, the first phasor at the second time, the second phasor at the first time, or the second phasor at the second time, includes an amplitude proportional to a variation in amplitude about a mean amplitude of the modulated signal.

5. A transmitter configured to deconstruct a modulated signal into one or more phasor fragments, comprising:
    a phase determination component configured to compare an angle of separation between a phase of a first phasor at a first time and the phase of the first phasor at a second time to an angle of separation between a phase of a second phasor at the first time and the phase of the first phasor at the second time; and
    a phasor processing component configured to set the phase of the first phasor at the second time to be equal to the phase of the second phasor at the first time, or configured to set the phase of the second phasor at the second time to be equal to the phase of the first phasor at the first time, responsive to the comparison to modify bandwidth requirements of the modulated signal.

6. The transmitter of claim 5, wherein one or more of the first phasor at the first time, the first phasor at the second time, the second phasor at the first time, or the second phasor at the second time, comprises a fragment phasor.

7. The transmitter of claim 5, wherein one or more of the first phasor at the first time, the first phasor at the second time, the second phasor at the first time, or the second phasor at the second time, comprises a time sample.

8. The transmitter of claim 5, wherein the first phasor at the first time, the first phasor at the second time, the second phasor at the first time, or the second phasor at the second time, includes an amplitude proportional to a variation in a mean amplitude of the modulated signal.

9. An article of manufacture comprising instructions stored thereon, wherein the instructions, when executed by a processor, cause the processor to:
    compare an angle of separation between a phase of a first phasor at a first time and the phase of the first phasor at a second time to an angle of separation between a phase of a second phasor at the first time and the phase of the first phasor at the second time; and
    set the phase of the first phasor at the second time to be equal to the phase of the second phasor at the first time, or setting the phase of the second phasor at the second time to be equal to the phase of the first phasor at the first time, responsive to the comparison to modify bandwidth requirements of the modulated signal.

10. The article of manufacture of claim 9, wherein one or more of the first phasor at the first time, the first phasor at the second time, the second phasor at the first time, or the second phasor at the second time, comprises a fragment phasor.

11. The article of manufacture of claim 9, wherein one or more of the first phasor at the first time, the first phasor at the second time, the second phasor at the first time, or the second phasor at the second time, comprises a time sample.

12. The article of manufacture of claim 9, wherein the first phasor at the first time, the first phasor at the second time, the second phasor at the first time, or the second phasor at the second time, includes an amplitude proportional to a variation in a mean amplitude of the modulated signal.

13. An orthogonal frequency division multiple access transmitter, comprising:
    means for comparing an angle of separation between a phase of a first phasor at a first time and the phase of the first phasor at a second time to an angle of separation between a phase of a second phasor at the first time and the phase of the first phasor at the second time; and
    means for setting the phase of the first phasor at the second time to be equal to the phase of the second phasor at the first time, or setting the phase of the second phasor at the second time to be equal to the phase of the first phasor at the first time, responsive to the comparison to modify bandwidth requirements of the modulated signal.

14. The transmitter of claim 13, wherein one or more of the first phasor at the first time, the first phasor at the second time, the second phasor at the first time, or the second phasor at the second time, comprises a fragment phasor.

15. The transmitter of apparatus claim 13, wherein one or more of the first phasor at the first time, the first phasor at the second time, the second phasor at the first time, or the second phasor at the second time, comprises a time sample.

16. The transmitter of apparatus claim 13, wherein the first phasor at the first time, the first phasor at the second time, the second phasor at the first time, or the second phasor at the second time, includes an amplitude proportional to a variation in a mean amplitude of the modulated signal.

* * * * *

UNITED STATES PATENT AND TRADEMARK OFFICE
CERTIFICATE OF CORRECTION

PATENT NO. : 7,787,551 B2
APPLICATION NO. : 11/488383
DATED : August 31, 2010
INVENTOR(S) : Parker et al.

It is certified that error appears in the above-identified patent and that said Letters Patent is hereby corrected as shown below:

Title page, item (57), under "Abstract", in Column 2, Line 15, delete "$V_\alpha$" and insert -- $V_\beta$ --.

Title page, item (57), under "Abstract", in Column 2, Line 16, delete "$V_A$" and insert -- $V_B$ --.

Page 2, item (56), under "Other Publications", in Column 1, Line 7, delete "Technlogy," and insert -- Technology, --.

Page 2, item (56), under "Other Publications", in Column 2, Line 25, delete ""Performanace and implimentation" and insert -- "Performance and implementation --.

Page 2, item (56), under "Other Publications", in Column 2, Line 30, delete "atwo-branch" and insert -- a two-branch --.

Column 8, Line 56, in Claim 15, delete "of apparatus" and insert -- of --.

Column 8, Line 60, in Claim 16, delete "of apparatus" and insert -- of --.

Signed and Sealed this
Third Day of July, 2012

David J. Kappos
*Director of the United States Patent and Trademark Office*